(12) United States Patent
Bock et al.

(10) Patent No.: US 10,081,747 B2
(45) Date of Patent: Sep. 25, 2018

(54) MULTILAYER ABRASIVE PARTICLE

(71) Applicant: Klingspor AG, Haiger (DE)

(72) Inventors: Irene Bock, Dillenburg (DE); Thomas Kamps, Holzwickede (DE)

(73) Assignee: KLINGSPOR AG, Haiger (DE)

( * ) Notice: Subject to any disclaimer, the term of this patent is extended or adjusted under 35 U.S.C. 154(b) by 0 days.

(21) Appl. No.: 15/317,225

(22) PCT Filed: May 29, 2015

(86) PCT No.: PCT/DE2015/100214
§ 371 (c)(1),
(2) Date: Dec. 8, 2016

(87) PCT Pub. No.: WO2015/192829
PCT Pub. Date: Dec. 23, 2015

(65) Prior Publication Data
US 2017/0114260 A1     Apr. 27, 2017

(30) Foreign Application Priority Data
Jun. 18, 2014 (DE) .................. 10 2014 108 602

(51) Int. Cl.
*C09K 3/14* (2006.01)

(52) U.S. Cl.
CPC ........ *C09K 3/1409* (2013.01); *C01P 2004/30* (2013.01)

(58) Field of Classification Search
CPC ..................... C09K 3/1409; C01P 2004/30
See application file for complete search history.

(56) References Cited

U.S. PATENT DOCUMENTS

| | | | |
|---|---|---|---|
| 1,871,793 | A | 8/1932 | Horsfield |
| 2,682,700 | A | 7/1954 | Simoneau |
| 4,111,713 | A | 9/1978 | Beck |
| RE29,808 | E | 10/1978 | Wagner |
| 5,213,591 | A | 5/1993 | Celikkaya et al. |
| 5,653,775 | A | 8/1997 | Plovnick et al. |
| 7,632,434 | B2 | 12/2009 | Duescher |
| 2003/0157868 | A1 | 8/2003 | Krupp |

(Continued)

FOREIGN PATENT DOCUMENTS

| | | |
|---|---|---|
| CN | 102281992 A | 12/2011 |
| CN | 103702800 A | 4/2014 |

(Continued)

OTHER PUBLICATIONS

The International Search Report dated Sep. 8, 2015 for International Application No. PCT/DE2015/100214.

(Continued)

*Primary Examiner* — Pegah Parvini
(74) *Attorney, Agent, or Firm* — Quarles & Brady LLP

(57) ABSTRACT

The invention relates to a multilayer abrasive particle (01) having a layer structure of stacked layers (02), each of the layers (02) being formed parallel to a plane (E). The exposed surfaces (04) of the layers (02) not covered by another layer and/or the edges (08) connecting the exposed surfaces (04) extend at least partially convexly or concavely in relation to the plane (E) and/or to a plane (E2) that is perpendicular thereto and comprises the direction (03) of the layer thickness.

9 Claims, 1 Drawing Sheet

(56) References Cited

U.S. PATENT DOCUMENTS

Figure 1:
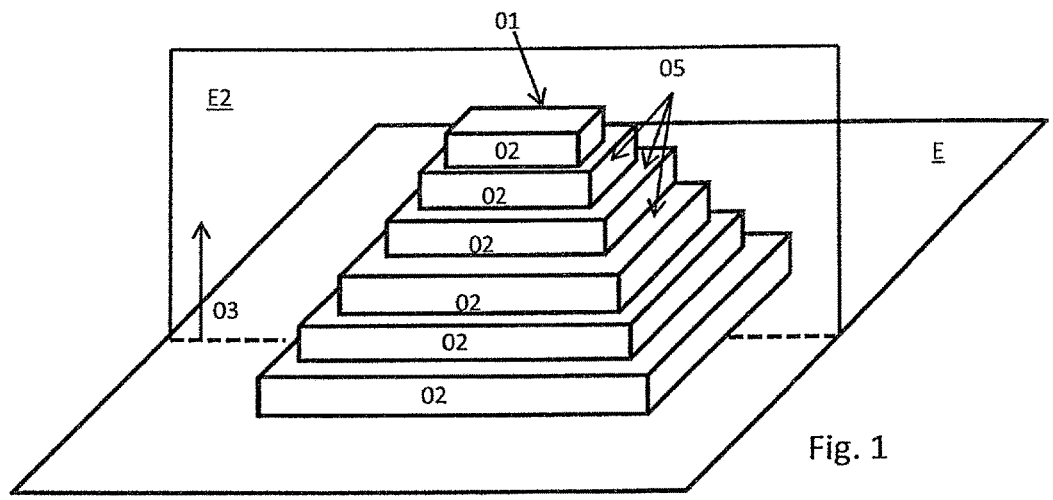

| | | |
|---|---|---|
| 2003/0196325 A1 | 10/2003 | Pratt |
| 2005/0118939 A1* | 6/2005 | Duescher ............... B24D 11/00 451/527 |
| 2005/0255801 A1 | 11/2005 | Pollasky |
| 2006/0213225 A1 | 9/2006 | Pratt |
| 2007/0293130 A1 | 12/2007 | Miekka et al. |
| 2008/0022718 A1 | 1/2008 | Pratt |
| 2009/0165394 A1* | 7/2009 | Culler ....................... B01J 2/22 51/296 |
| 2011/0146509 A1 | 6/2011 | Welygan et al. |
| 2012/0167481 A1* | 7/2012 | Yener ................... C09K 3/1409 51/308 |
| 2013/0180180 A1 | 7/2013 | Yener et al. |
| 2013/0212952 A1 | 8/2013 | Welygan et al. |
| 2015/0087489 A1 | 3/2015 | Sato et al. |
| 2015/0089881 A1 | 4/2015 | Stevenson et al. |

FOREIGN PATENT DOCUMENTS

| | | |
|---|---|---|
| EP | 1935957 A1 | 6/2008 |
| GB | 1451372 | 9/1976 |
| JP | 2001 157968 A | 6/2001 |
| JP | 2001157968 A | 6/2001 |
| JP | 2005040873 A | 2/2005 |
| JP | 2006114861 A | 4/2006 |
| WO | 9954424 A1 | 10/1999 |
| WO | 2000/38886 A1 | 7/2000 |
| WO | 03018261 A2 | 3/2003 |
| WO | 2011087649 A9 | 7/2011 |
| WO | 2011139562 A2 | 11/2011 |
| WO | 2013/003830 A2 | 1/2012 |
| WO | 2014/020068 | 2/2012 |
| WO | 2012061033 A2 | 5/2012 |
| WO | 2013102170 A1 | 7/2013 |
| WO | 2013102177 A1 | 7/2013 |
| WO | 2013151745 A1 | 10/2013 |

OTHER PUBLICATIONS

Jang, et al., Fabrication and Deformation of Three-Dimensional Hollow Ceramic Nanostructures, Nature Materials, 2013, 12:893-898.

* cited by examiner

MULTILAYER ABRASIVE PARTICLE

CROSS-REFERENCE TO RELATED APPLICATIONS

This application represents the national stage entry of PCT International Application No. PCT/DE2015/100214 filed May 29, 2015 and claims priority to German Patent Application No. 10 2014 108 602.3 filed Jun. 18, 2014. The contents of this application are hereby incorporated by reference as if set forth in their entirety herein.

The present invention relates to multilayer abrasive particles and to abrasives using said multilayer abrasive particles.

Generic abrasive particles consist of ceramic materials, for example, and are arranged on a support or on a substrate by means of an adhesive so as to be used as abrasives for processing or for grinding a workpiece.

Generic abrasive particles are produced by extrusion, for example. Alternatively, the abrasive particles can also be produced by screen printing. Suitable material systems for the abrasive particles include sol-gel systems, for example, the sol being extruded or printed in a state not too far from the gel point and the sol subsequently hardening into the abrasive particle by transitioning into the gel state. With ceramic systems, a hardening step in the form of a calcination step may be additionally envisaged in order to fully harden the abrasive particles and to bring about the ceramic properties of the material system.

The particular challenge with generic abrasive particles is designing the surface and the volume of the abrasive particles in such a manner, that the grinding performance of the abrasive and, in the ideal case, of each individual abrasive particle stays as largely constant as possible during grinding, i.e. during wear of the abrasive particle. Grinding performance is determined inter alia by the surface of the abrasive particles that comes into contact with the workpiece during grinding.

Hence, targeted manipulation of the surface structure of the abrasive particles that leads to an abrasive particle surface as random as possible is particularly desirable because a targeted adjustment of the grinding performance is achieved via the surface and the change of the surface during grinding.

Therefore, the object of the present invention is to provide an abrasive particle and an abrasive using abrasive particles according to the invention that exhibit improved grinding performance based on surface modification.

This object is attained by a multilayer abrasive particle according to the preamble of claim 1. Furthermore, the object according to the invention is attained by an abrasive according to the preamble of claim 4. Advantageous embodiments of the invention are the subject-matter of the dependent claims.

The starting point of the teaching of the invention is constituted by multilayer abrasive particles having a layer structure of stacked layers, each of the layers being formed parallel to a plane. Multilayer abrasive particles of this kind can be produced in a repeated screen-printing process, for example, and are significantly more advantageous compared to other abrasive particles, such as extruded or single-layer abrasive particles, in terms of surface design and in terms of volume design alone, which means that the grinding performance can be improved by reducing the surface of the abrasive particles that comes into contact with the workpiece and an improved consistency of the surface that comes into contact with the workpiece during wear of the abrasive particle can be achieved.

However, these multilayer abrasive particles have the disadvantage that due to manufacture, the exposed surfaces, i.e. the layer surfaces not covered by other layers, are substantially arranged at right angles to each other and the abrasive particle edges connecting the exposed surfaces are largely straight.. A layer arrangement of this kind and the resulting surfaces of the abrasive particles with the largely right angles between the exposed surfaces of the abrasive particles collectively lead to a limitation of the grinding performance.

To further improve the grinding performance of the abrasive particles, it is thus provided that the multilayer abrasive particles according to the invention have exposed surfaces that are at least partially convex and/or concave both in relation to a plane of the layers and in relation to a plane that is perpendicular to said plane and comprises the direction of the layer thickness.

Likewise, it may be provided according to the invention that the edges of the abrasive particles according to the invention that connect the exposed surfaces of the abrasive particles are convex and/or concave at least in sections.

The effect of the proposed change of the exposed surfaces and/or of the edges of the abrasive particles is that the surface of the abrasive particles according to the invention has a significantly higher number of acute or small angles compared to the generic multilayer abrasive particles, which consist of a plurality of cuboid or plate-shaped layers arranged substantially parallel to each other and whose exposed surface ultimately forms a substantially rectangular stepped structure. Providing acute angles on the surface of the abrasive particles is only one way of positively manipulating the surface that comes into contact with the workpiece in the initial state or during wear of the abrasive particle. Depending on the basic geometry of the abrasive particles, other convex and/or concave deformations of the exposed surfaces may lead to an optimized surface, as well.

Abrasive particles of this kind according to the invention can be obtained, for example, by correspondingly changing or adapting the hardening process for generic multilayer abrasive particles. In other words, this means that as a function of the respective material system, special temperature profiles during the hardening of generic multilayer abrasive particles, such as printed multilayer abrasive particles, lead in a targeted manner to the exposed surfaces and/or edges according to the invention that are convexly and/or concavely deformed in relation to the plane and the plane that is perpendicular thereto and comprises the direction of the layer thickness.

It is particularly advantageous if the multilayer abrasive particles are designed in such a manner that the layers form a shell, which encloses a hollow space within the abrasive particle. Through this kind of combination of the concavely and/or convexly designed edges and surfaces together with a shell/hollow-space structure, the grinding performance of the abrasive particle according to the invention can be kept on an especially high level altogether even during wear in the course of the grinding process because the surface coming into contact with the workpiece is not only minimized but also largely constant during wear of the abrasive particle.

It may also be provided in a particularly advantageous manner that the multilayer abrasive particles approximate a spherical shape by way of the curvature of the exposed surfaces and/or edges according to the invention. This is further particularly advantageous if the sphere is realized as a hollow sphere. This means that the abrasive particles approximate a spherical shape on the exposed surfaces on the outer side of a shell and, if applicable, also on the inner side of a shell consisting of the respective layers, the shell thus forming a spherical shell, which in turn encloses an approximately spherical hollow space, if applicable.

While no points or exposed surfaces with small angles are produced in case of the proposed spherical shape of the multilayer abrasive particles, multilayer abrasive particles in the shape of an approximated sphere or in the shape of an approximated hollow sphere are still advantageous as abrasive particles exhibiting particularly high and particularly constant high grinding performance, as well, because especially in the case of the hollow sphere, the surface coming into contact with the workpiece is relatively small both in the original state and in the state of partial wear, which leads to particularly high grinding performance when a corresponding pressure is exerted onto the workpiece.

Furthermore, abrasives are provided according to the invention that comprise abrasive particles according to the embodiments described above. It may be provided, for example, that abrasive particles are attached to a substrate by means of an adhesive.

Hereinafter, individual embodiments of the teaching according to the invention will be explained with the aid of merely schematic drawings.

Figure 2:
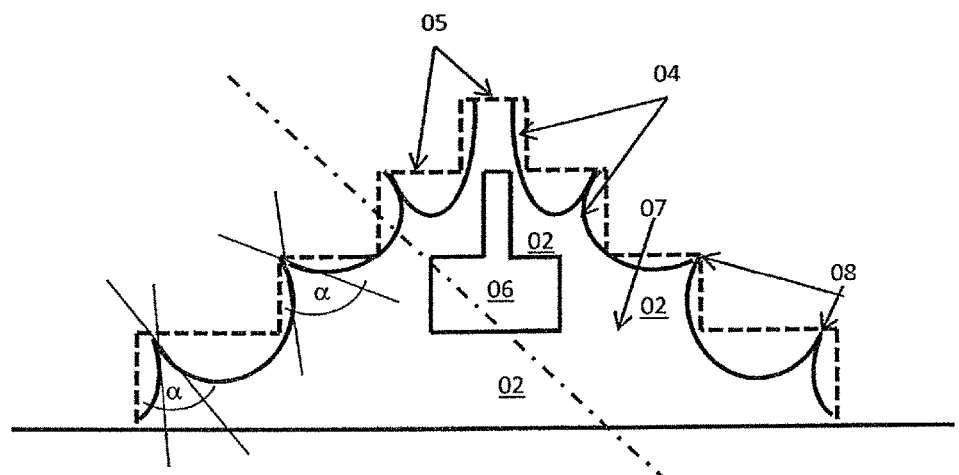

In the drawings:

FIG. 1 shows a multilayer abrasive particle according to the state of the art; and FIG. 2 shows a section through a first embodiment of a multilayer abrasive particle according to the invention.

FIG. 1 shows a multilayer abrasive particle 01, which consists of a plurality of individual layers 02. The multilayer abrasive particle 01 can be produced in the course of a multi-stage screen-printing process, for example, in which one of the layers 02 is deposited or printed in each individual printing step. The lowest layer 02 can be printed onto a substrate layer, for example, a plane E thus being defined, to which the respective layers 02 are formed parallel and as cuboids or plates in the broadest sense. As can be taken from FIG. 1, the result is a multilayer abrasive particle having exposed surfaces that are substantially arranged at right angles to one another and largely parallel to plane E and perpendicularly to planes that comprise the direction 03 of the layer thickness and are perpendicular to plane E.

FIG. 2 exemplarily shows a section through a multilayer abrasive particle 01, which comprises multiple layers 02, as well. The continuous lines in the illustration of the multilayer abrasive particle 01 of FIG. 2 represent the exposed surfaces 04 of the multilayer abrasive particle 01, which are deformed according to the invention. By way of dashed lines, FIG. 2 also shows the exposed surfaces of a generic multilayer abrasive particle 01 as the one illustrated in FIG. 1, for example, in comparison to the surfaces 04 according to the invention. Furthermore, FIG. 2 illustrates a hollow space 06, which is enclosed by a shell 07 formed by the layers 02. As can be clearly taken from FIG. 2 in particular by comparing the dashed-line illustration of the largely rectangular stepped structure of the exposed surface 05 of a generic multilayer abrasive particle with the exposed surfaces 04 of the abrasive particle 01, which are deformed according to the invention, the transitions formed by exposed surface 04 between the respective layers 02 is realized in some places by significantly smaller angles α compared to the 90° angles of exposed surface 05. In this way, a significant increase of the grinding performance is ensured.

Also according to the invention, but not visible in FIG. 2 because of the illustration of a section through the multilayer abrasive particle 01, it may be provided that the edges 08 connecting the exposed surfaces 04 of the respective layers 02 are convexly and/or concavely curved, as well, which allows the grinding performance of the multilayer abrasive particles to be further increased. As illustrated by the plane of wear 09 represented by the dashed-and-dotted line in FIG. 2, the hollow space 06 within the shell 07 has the effect that the exposed surface 04 or the abrasive particle surface that comes into contact with the workpiece during wear of the abrasive particle 01 varies only to a small degree, thus allowing the overall high grinding performance to be maintained even during wear of the multilayer abrasive particle 01.

The invention claimed is:

1. A multilayer abrasive particle, said particle comprising: stacked layers parallel to a plane (E), said stacked layers forming a layer structure including exposed surfaces of the layers not covered by another layer and/or edges connecting the exposed surfaces, said exposed surfaces extending at least partially convexly or concavely in relation to the plane (E) and/or to a plane (E2) that is perpendicular thereto and includes a direction of the layer thickness.

2. The multilayer abrasive particle according to claim 1, in which the layers form a shell enclosing a hollow space.

3. The multilayer abrasive particle according to claim 1, in which the layers form a spherical shape.

4. An abrasive comprising multilayer abrasive particles according to claim 1.

5. A multilayer abrasive particle, said particle comprising: a plurality of layers, at least some of said layers of said plurality of layers including an exposed surface not covered by another layer of said plurality of layers and/or edges of another layer of said plurality of layers, said exposed surfaces extending at least partially convexly or concavely.

6. The multilayer abrasive particle according to claim 5, in which said plurality of layers are parallel to a plane (E), and said exposed surfaces extend at least partially convexly or concavely in relation to the plane (E) and/or to a plane (E2) that is perpendicular to the plane E.

7. The multilayer abrasive particle according to claim 5, in which the layers of said plurality of layers form a shell enclosing a hollow space.

8. The multilayer abrasive particle according to claim 5, in which the layers of said plurality of layers approximate a spherical shape.

9. The multilayer abrasive particle according to claim 5, in which adjacent exposed surfaces of said exposed surfaces define an angle less than 90 degrees.

* * * * *